United States Patent [19]

Schaefer et al.

[11] 4,432,958

[45] Feb. 21, 1984

[54] METHOD FOR THE SELECTIVE REMOVAL AND RECOVERY OF AMMONIA FROM AMMONIA- AND HYDROGEN SULFIDE-CONTAINING GAS MIXTURES

[75] Inventors: Nikolaus Schaefer, Essen; Winfried Dellmann, Kamen; Gerd Louis, Essen, all of Fed. Rep. of Germany

[73] Assignee: Bergwerksverband GmbH, Essen, Fed. Rep. of Germany

[21] Appl. No.: 338,563

[22] Filed: Jan. 11, 1982

[30] Foreign Application Priority Data

Jan. 10, 1981 [DE] Fed. Rep. of Germany ....... 3100568

[51] Int. Cl.$^3$ .............................................. C01C 1/02
[52] U.S. Cl. .................................... 423/356; 423/222; 423/238
[58] Field of Search .................... 423/238, 222, 356

[56] References Cited

U.S. PATENT DOCUMENTS

| 1,065,566 | 6/1913 | Tufts | 423/238 |
|---|---|---|---|
| 1,795,120 | 3/1931 | Hansen | 423/222 |
| 1,795,121 | 3/1931 | Hansen | 423/238 |
| 2,152,454 | 3/1939 | Baehr | 423/222 |
| 2,161,663 | 6/1939 | Baehr et al. | 423/238 |
| 2,500,291 | 3/1950 | Liebel et al. | 423/238 |
| 3,819,816 | 6/1974 | Wunderlich et al. | 423/238 |
| 4,160,725 | 7/1979 | Josis et al. | 423/356 |
| 4,302,430 | 11/1981 | Weber et al. | 423/356 |

FOREIGN PATENT DOCUMENTS

| 1141267 | 12/1962 | Fed. Rep. of Germany | 423/356 |
|---|---|---|---|
| 49-23568 | 6/1974 | Japan | 423/238 |
| 6983 | of 1884 | United Kingdom | 423/222 |
| 307064 | 6/1971 | U.S.S.R. | 423/238 |
| 740714 | 6/1980 | U.S.S.R. | 423/238 |

Primary Examiner—Earl C. Thomas
Assistant Examiner—Wayne A. Langel
Attorney, Agent, or Firm—Michael J. Striker

[57] ABSTRACT

The ammonia contained in ammonia- and hydrogen sulfide-containing gas mixtures is selectively removed through a gas washing with an aqueous ammonium sulfite-bisulfite solution, and recovered from the wash solution as a concentrated aqueous solution. For this purpose the coke oven crude gas is washed with an ammonium sulfite-bisulfite solution led in circulation, the surface tension of which amounts to below $80 \times 10^{-5}$ N/cm, then the ammonia gas is driven away from the wash solution enriched with ammonia, e.g. by means of steam, and the released ammonia is recovered e.g. as aqueous ammonium solution through condensation of the vapor. The gas mixture is preferably purified or unpurified coke oven crude gas. In order to reduce the surface tension of the wash solution, alkyl sulfate, alkylamine, pyridine base, phenol or homologs thereof are added as surface active substance. The wash circulation is performed at between 15° and 32° C.

11 Claims, 1 Drawing Figure

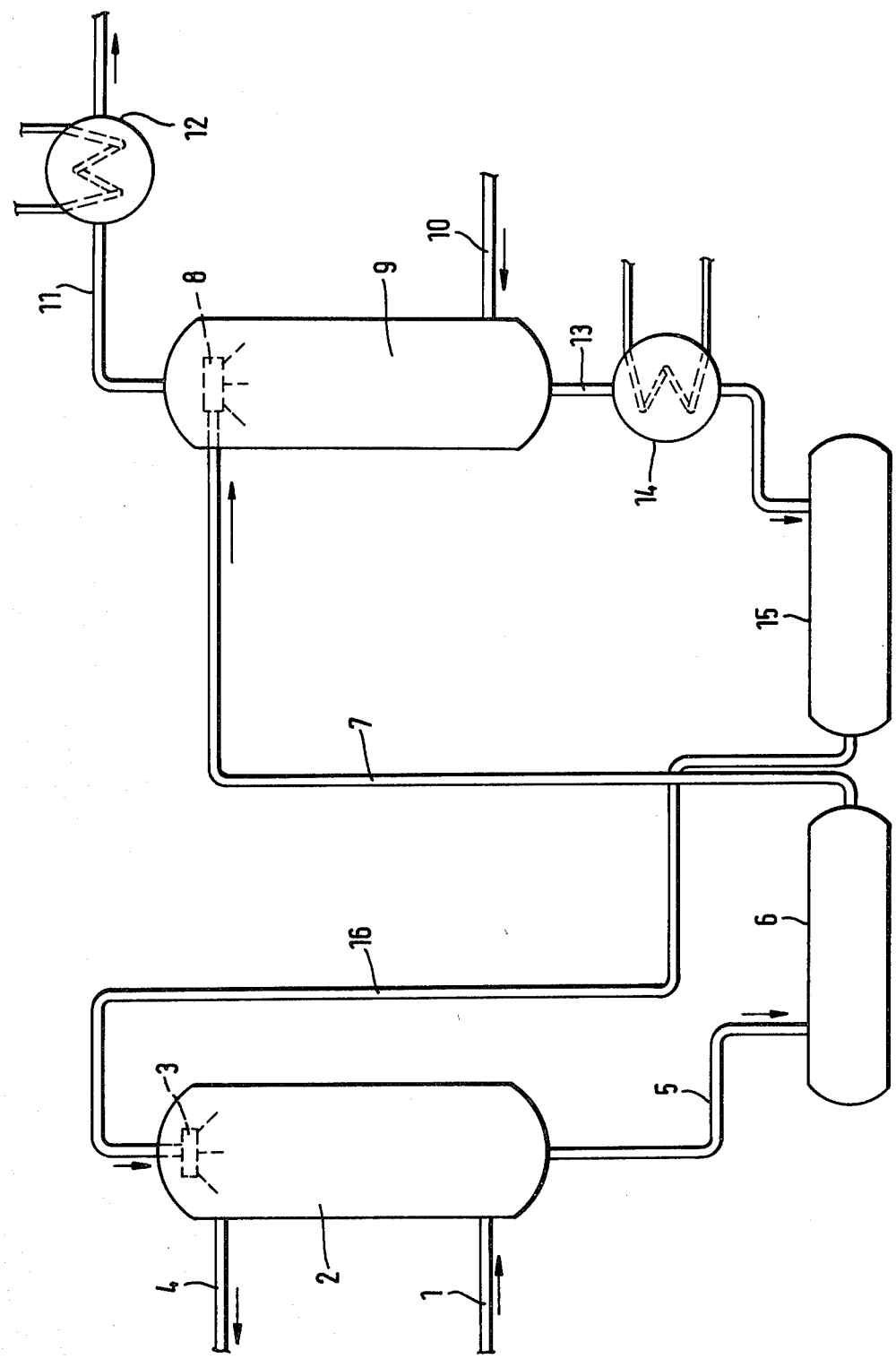

METHOD FOR THE SELECTIVE REMOVAL AND RECOVERY OF AMMONIA FROM AMMONIA- AND HYDROGEN SULFIDE-CONTAINING GAS MIXTURES

BACKGROUND OF THE INVENTION

The invention concerns a method for the selective removal and recovery of ammonia from gas mixtures containing ammonia and hydrogen sulfide.

With the coking of hard coal, pyrolysis gases form, which contain ammonia. The removal of the ammonia from the coking plant gas and its working up into ammonium sulfate according to the known indirect and half-direct methods contributed until about 1962 to the cost of coking. The then instituted degression of proceeds for valuable carbon materials in general, and for ammonia-containing products in particular, lead to introduction of methods for the destruction of the coking plant ammonia, in order to remove the ammonia from the coking plant gas, thus exclusively under the point of view of gas purification. Moreover, since in the presence of steam, hydrogen sulfide and hydrogen cyanide, ammonia acts strongly corrosively, it must be removed from the coking plant gas in order to protect gas distribution and working-up arrangements.

Considering increasing energy and raw material costs, and the thereby improved value of coking plant ammonia, it appears today no longer convenient to destroy the ammonia contained therein. It is, to the contrary, appropriate to recover the ammonia. This applies to all other gas mixtures, which—such as coking plant gas—contain among others, ammonia and hydrogen sulfide.

It has already been known for a long time that ammonia can be washed from coal distillation gases with an aqueous solution of ammonium bisulfite. Thus, at the beginning of this century, the Burkheiser method (DRP 212209, 215907, 217315) was run experimentally (See O. Grosskinsky, Handbook of Coking Plant Practice, Bd. II, Karl Knapp Verlag, Duesseldorf, 1958, pp. 286-287). Upon such washing, ammonium sulfite is formed which is oxidized into ammonium sulfate. The wash solution for this known method, however, does not selectively bind the ammonia, which enters instead into a side reaction with the hydrogen sulfide of the coal distillation gases, whereby there occurs a formation of sulphur dioxide in favor of a thio-sulfate concentration, whereby however the absorption capacity of the wash solution for ammonia is lowered.

The fundamental idea of the Burkheiser method is that there occurs a buildup of a greater solubility for the ammonium bisulfite compared to the ammonium sulfite, in such manner that crude coke oven gas, purged of sulfur, is washed with an ammonium bisulfite solution for absorption of the ammonia. The employed wash solution is again saturated with sulfurous acid, and returned into the circulation as wash liquid (Das Gas- und Wasserfach 70 (1927), pp. 309-310).

SUMMARY OF THE INVENTION

The invention is therefore based upon the object of removing ammonia selectively from ammonia- and hydrogen sulfide-containing gas mixtures, in particular coke oven crude gas, by washing, and recovering it as concentrated aqueous solution.

To do so, the aqueous solution of ammonia and sulfur dioxide, which serves for removal of the ammonia from the coking plant gas, is so modified according to the present invention, that its surface tension is significantly altered, in contrast to a pure ammonium-hydrogen sulfite solution.

This is done according to the present invention by washing the coking oven crude gas with an ammonium sulfite-bisulfite solution lead in circulation, the surface tension of which amounts to below $80 \times 10^{-5}$ N/cm, then driving ammonia away from the wash solution enriched with ammonia, e.g. using steam, and recovering the released ammonia, e.g. as aqueous ammonia solution through condensation of the vapors, whereas the separated wash solution is led back into the gas wash in circulation.

The gas mixtures can, for example, arise from liquefaction, gasification, low-temperature carbonization or coking of coal, or also from working up of petroleum or natural gas, and other chemical processes.

In general, according to the present invention, the wash circulation is accomplished at temperatures between about 15° and 32° C.

The wash solution can be composed of optional portions of ammonium sulfite and ammonium hydrogen sulfite, whereby a relatively greater portion of the latter improves the degree of ammonia concentration in the wash solution. A typical value includes having the same amount of each component, so that both substances form together an about 10–40% aqueous solution.

The desired selectivity of the ammonia washing (compared to $H_2S$) is thus obtained through reduction of the surface tension from about $80 \times 10^{-5}$ N/cm for the pure aqueous solution of ammonium sulfite/ammonium hydrogen sulfite to values favorably between $20 \times 10^{-5}$ and $70 \times 10^{-5}$ N/cm by means of surface active substances, for example sodium dodecyl hydrogen sulfate, dodecylamine, phenols and homologs, pyridine bases among others, which as much as possible should lead to no substantial foam formation. Decreased surface tension (based upon greater addition of surface active substances) thereby leads, in surprising manner, to an always great reduction in the formation of thiosulfate through the hydrogen sulfide, i.e. an increased selectivity of the ammonia washing. It is, however, a question of the amount of hydrogen sulfide present in the initial gas mixture, on the one hand, and the desired selectivity, on the other hand, how far the surface tension must be reduced. Only in extreme cases of particularly high amounts of $H_2S$ and/or particularly high desired selectivity, should it be considered to go beyond the disclosed values through an extremely high addition of surface active substances.

As corrosion inhibitors according to the present invention, there can be added to the wash solution e.g. the known so-called Ferrameen, which simultaneously is surface active.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows in schematic representation a plant for accomplishment of the method according to the present invention.

DESCRIPTION OF THE PREFERRED EMBODIMENTS

Coke oven crude gas which contains hydrogen sulfide and ammonia, enters after cooling through conduit 1 into the gas washer 2, which through conduit 16 is loaded with the wash solution led in circulation over the nozzle 3. After the selective washing out of the ammonia, the ammonia-freed coke oven crude gas leaves the gas washer 2 over conduit 4 into the further gas cleaning apparatus. The wash solution, enriched in ammonia, leaves through conduit 5 into the reservoir container 6. From there, the wash solution is led through conduit 7 into a decanter column 9, where it is fed over a distributing facility 8. In decanter 9 the ammonia bound by the wash solution is driven off through steam fed in at 10. The gaseous ammonia leaves the decanter 9 together with the steam through conduit 11 and is condensed in condenser 12 as aqueous ammonium solution. The separated wash solution leaves decanter 9 through conduit 13, is cooled in cooler 14, and flows into container 15. The wash solution is then again fed, through conduit 16, from container 15 into the gas washer 2, over the nozzle 3.

EXAMPLE 1

1,000 $m_n^3$ of a coke oven crude gas cooled to 25° C., with an ammonia content of 5 $g/m_n^3$ and a hydrogen sulfide content of 1 $g/m_n^3$ are washed with a wash solution in an amount of 240 kg/h. The wash solution is an aqueous solution of 17 percent by weight sulfur dioxide and 9.5 percent by weight ammonia, the surface tension of which has been reduced through addition of dodecylamine to $53 \times 10^{-5}$ N/cm.

The ammonia contained in the coke oven crude gas converts upon washing completely to ammonium sulfite, whereas at the same time only 0.1 kg/h hydrogen sulfide are absorbed by the wash solution.

The enriched wash solution is then led to a decanter, where at a temperature from 102° to 107° C., the bound ammonia is driven off with 210 kg/h steam.

About 5 kg/h ammonia leave the decanter in gaseous state with the steam, and are then condensed as ammonia water.

EXAMPLE 2

Cooled and detarred coking plant gas is washed into a suitable absorber, which can be a plate column or spray absorber, with the wash solution which is composed of water, ammonia and sulfur dioxide as well as a mixture of phenols and pyridine bases. The wash solution takes up the ammonia from the coking plant gas almost quantitatively, whereas acid components of the gas, such as i.e. hydrogen sulfide, are absorbed only to a small extent. The quantities involved are as follows:

1,000 $m_n^3$ coking plant gas with a content of 5 g $NH_3/m_n^3$ and 8 g $H_2S/m_n^3$ are washed with 200 kg wash solution, which contains 30 percent by weight ammonia and sulfur dioxide in a mole ration $NH_3:SO_2 = 1.5:1$. The temperature of the gas and the wash solution amounts preferably to less than 32° C. Thereby the ammonia is removed from the coking plant gas to the extent of a residual content of less than 0.02 $g/m_n^3$; simultaneously, on the average 18 percent by weight of the $H_2S$ is absorbed by the wash solution. 0.1% phenol and 0.1% pyridine are then added to the wash solution, and the coking plant gas is washed therewith, whereby one obtains the same degree of washing out of $NH_3$; in this case however only 12 percent of the $H_2S$ is washed out. By increasing the addition of surface active substances to 0.5% phenol and 0.5% pyridine, one obtains a further increase in the selectivity of the washing: with the same degree of ammonia absorption the $H_2S$-washing-out is reduced to about 5%. ($m_n^3$ = cubic meter at standard temperature and pressure.)

An advantage obtainable with the present invention is in particular that the coking plant ammonia is not only removed from the coke oven crude gas, but also can be recovered in economical manner in the form of a concentrated, aqueous ammonium solution. A further advantage of the method according to the present invention is that through reduction of the surface tension of the wash solution the selectivity of the ammonia wash is increased.

It will be understood that each of the elements described above, or two or more together, may also find a useful application in other types of gas removals differing from the types described above.

While the invention has been illustrated and described as embodied in a method for the selective removal and recovery of ammonia from coke oven crude gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Method for the removal and recovery of ammonia from ammonia- and hydrogen sulfide-containing gas mixtures through a washing with aqueous solutions of ammonium sulfite-bisulfite, comprising washing the gas mixture with an ammonium sulfite-bisulfite solution led in circulation, the surface tension of which solution is reduced to below $80 \times 10^{-5}$ N/cm by addition of a surface active substance, to selectively wash out the ammonia, whereby the surface tension is the more reduced the more hydrogen sulfide is present in said gas mixture and the greater is the desired selectivity of ammonia washing, driving away ammonia gas from the wash solution enriched with ammonia, recovering the released ammonia, and leading the separated wash solution back into the gas wash in circulation.

2. Method according to claim 1, further comprising for adjustment of the surface tension of the wash solution, adding as surface-active substance, alkyl sulfate, alkylamine, pyridine base, phenol or homologs thereof.

3. Method according to claim 1, wherein the wash circulation is performed at temperatures between about 15° and 32° C.

4. Method according to claim 1, wherein said driving away ammonia gas is done by means of steam.

5. Method according to claim 4, wherein said recovering the released ammonia is done by condensation of vapors into aqueous ammonium solution.

6. Method according to claim 1, wherein the surface tension amounts to between 20 and $70 \times 10^{-5}$ N/cm.

7. Method according to claim 1, wherein said gas mixture is a coke oven crude gas.

8. Method according to claim 1, wherein the surface tension amounts to between 40 and $70 \times 10^{-5}$ N/cm.

9. Method according to claim 2, wherein about 0.01 to 2.0% phenol and homologs and its/or about 0.01 to 2.0% pyridine base are added to the wash solution.

10. Method according to claim 9, wherein about 0.05 to 1.0% phenol and homologs and its about 0.05 to 1.0% pyridine base are added to the wash solution.

11. Method according to claim 1, further comprising adding corrosion inhibitor to the wash solution.

* * * * *